United States Patent
Kondo et al.

(10) Patent No.: US 6,838,982 B2
(45) Date of Patent: Jan. 4, 2005

(54) VEHICLE DISPLAY SYSTEM

(75) Inventors: Kazuaki Kondo, Shizuoka (JP);
Toshitaka Takeguchi, Shizuoka (JP);
Shozo Ashizawa, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 51 days.

(21) Appl. No.: 10/436,146

(22) Filed: May 13, 2003

(65) Prior Publication Data

US 2003/0214391 A1 Nov. 20, 2003

(30) Foreign Application Priority Data

May 17, 2002 (JP) ........................................ 2002-142720

(51) Int. Cl.[7] .................................................. B60Q 1/00
(52) U.S. Cl. .......................... 340/438; 340/461; 702/123
(58) Field of Search ................................ 340/438, 461, 340/425.5, 815.4; 701/29; 702/123; 345/970

(56) References Cited

U.S. PATENT DOCUMENTS

| | | | |
|---|---|---|---|
| 4,287,503 A | * | 9/1981 | Sumida ...................... 340/461 |
| 4,884,058 A | * | 11/1989 | Ikeda .......................... 340/461 |
| 5,307,050 A | * | 4/1994 | Patton et al. ................ 340/517 |

FOREIGN PATENT DOCUMENTS

JP 2000-38058 2/2000

* cited by examiner

*Primary Examiner*—Brent A. Swarthout
(74) *Attorney, Agent, or Firm*—Armstrong, Kratz, Quintos, Hanson & Brooks, LLP (57) ABSTRACT

A vehicle display system comprises a plurality of display units and a controller unit. Each display unit has a receiver for receiving measured data indicating a state of the vehicle, and a driver controller for controlling an indicator driver according to the measured data. The controller unit has a transmitter for transmitting the measured data to the plurality of display units and a transmitter controller for controlling the transmission. Each display unit further comprises a generator for generating response data indicating a state of the indicator driver and a transmitter for transmitting the response data to the controller unit. The controller unit further comprises a receiver for receiving each response data and a comparator for comparing each response data with the measured data to judge whether each indicator driver is controllable or not. Further, the transmitter controller controls according to a judged result.

16 Claims, 8 Drawing Sheets

VEHICLE DISPLAY SYSTEM

BACKGROUND OF THE INVENTION

1. Field of the Invention

This invention relates to vehicle display systems, and particularly to a vehicle display system comprising a plurality of display units having a receiver for receiving measured data indicating a state of the vehicle and a driver controller for controlling an indicator driver for driving an indicator according to the measured data, and a controller unit having a transmitter for transmitting the measured data to the display units and a transmitter controller for controlling the transmitter.

2. Description of the Related Art

Generally, a vehicle display system provided in an interior of the vehicle is arranged in an instrument panel in front of a driver's seat in order that the driver sitting on the driver's seat can visually recognize respective display units of meter devices through a steering wheel. This vehicle display system includes a plurality of display areas for displaying vehicle speed, rotations per minute of a rotating shaft, fuel level, cooling water temperature gauge, and the like of the vehicle. These display areas are arranged efficiently in a same container in order that the driver can recognize a state of the vehicle at a glance.

Figure 10:
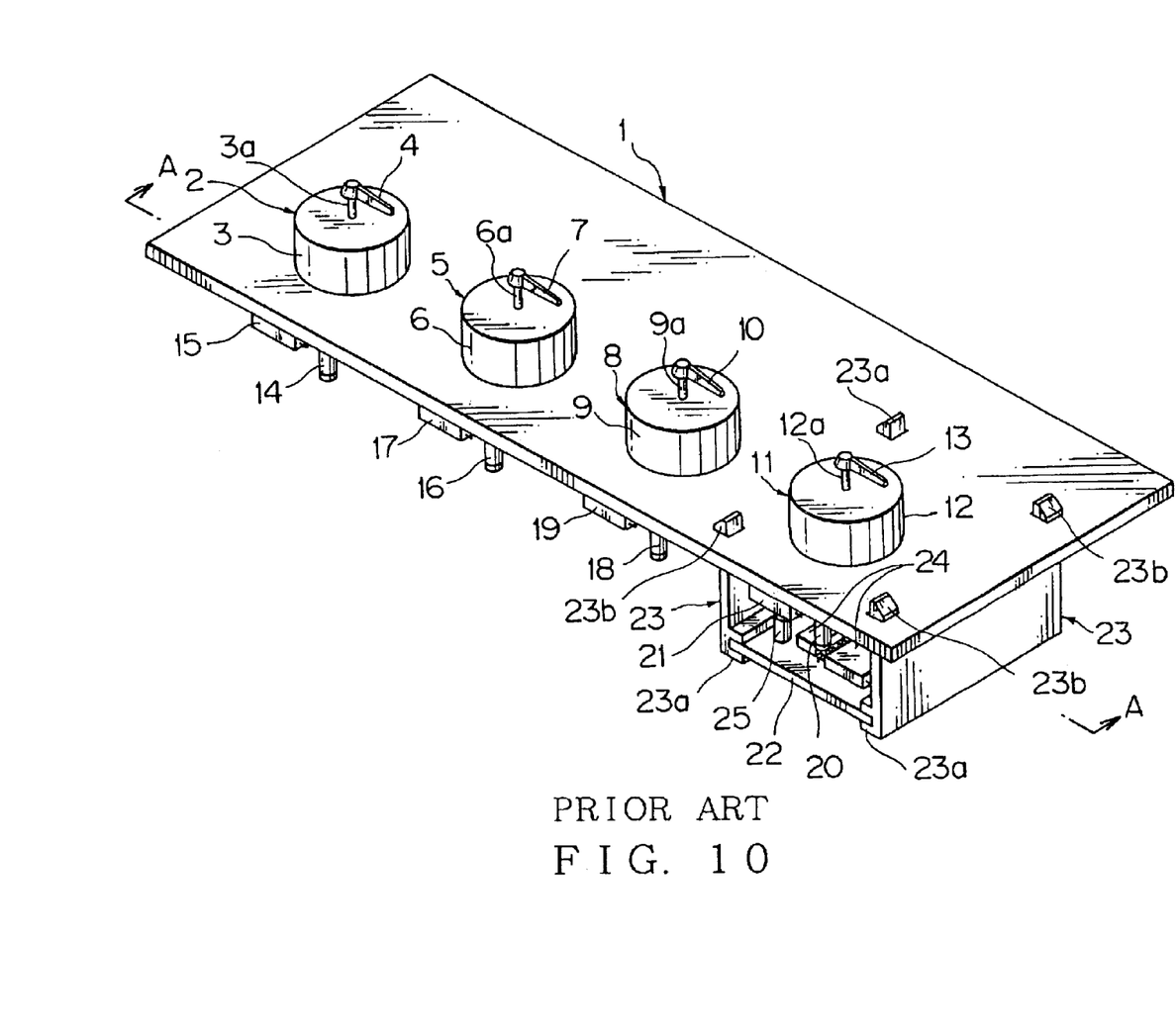
FIG. 10 is a perspective view showing a conventional vehicle display system.
Figure 11:
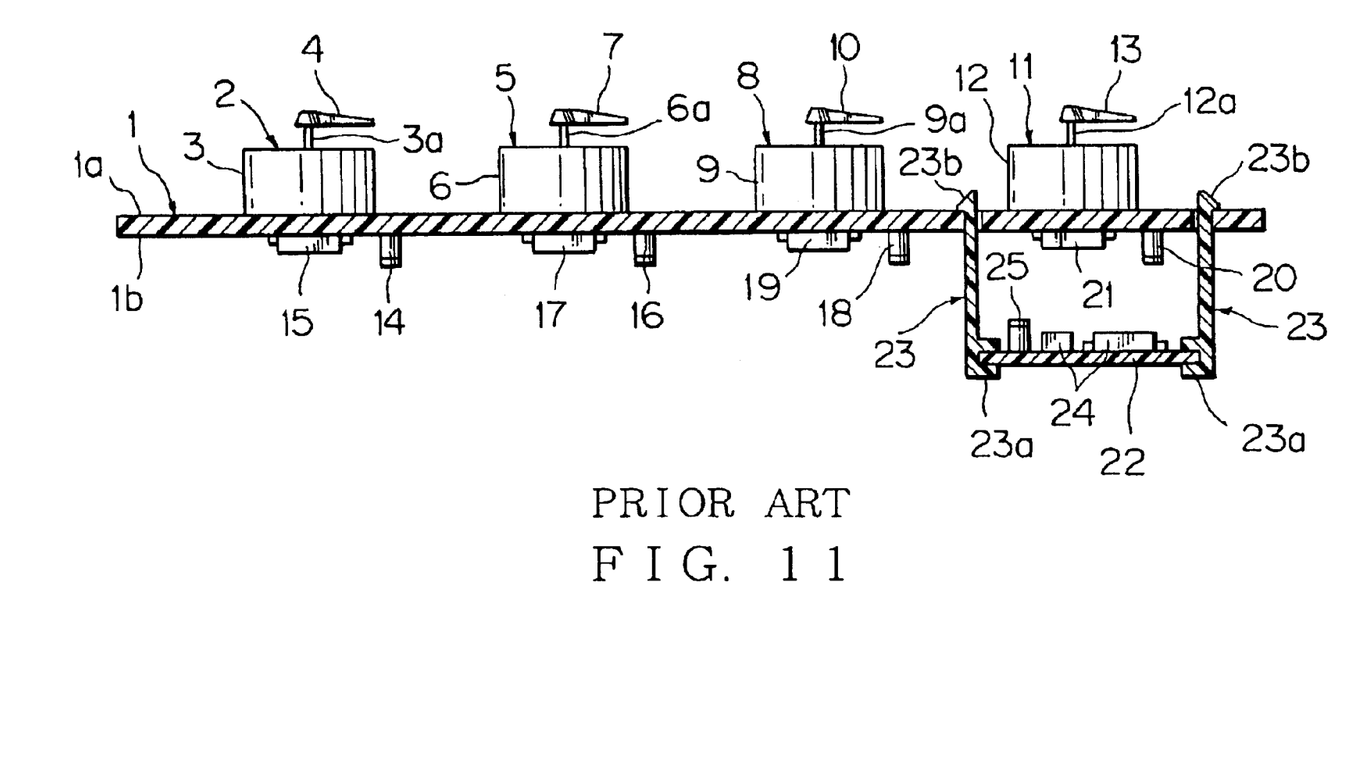
FIG. 11 is a cross-sectional view taken in line A—A of FIG. 10.

FIG. 10 is a perspective view showing a conventional vehicle display system, and FIG. 11 is a cross-sectional view taken on line A—A of FIG. 10.

A conventional vehicle display system comprises: a display unit board 1 on which a circuit pattern (not shown) is formed to connect a front surface 1a with a back surface 1b of the display unit board 1 electrically; and display units assembled on the front surface 1a of the display unit board 1 respectively, such as a speedometer 2 for indicating the vehicle speed, a tachometer 5 for indicating rotations per minute of a rotating shaft, a fuel gauge 8 for indicating the fuel level, and a thermometer 11 for indicating a temperature of the vehicle interior.

The speedometer 2 is composed of a stepper motor 3 fixed on the display unit board 1 and a pointer 4 attached to an output axis 3a of the stepper motor 3. The stepper motor 3 works as an inner mechanism for driving the pointer 4 according to the measured data of the vehicle speed.

The tachometer 5 is composed of a stepper motor 6 fixed on the display unit board 1 and a pointer 7 attached to an output axis 6a of the stepper motor 6. The stepper motor 6 works as an inner mechanism for driving the pointer 7 according to the measured data of the rotations per minute of the rotating shaft of the vehicle.

The fuel gauge 8 is composed of a stepper motor 9 fixed on the display unit board 1 and a pointer 10 attached to an output axis 9a of the stepper motor 9. The stepper motor 9 works as an inner mechanism for driving the pointer 10 according to the measured data of the amount of the fuel of the vehicle.

The thermometer 11 is composed of a stepper motor 12 fixed on the display unit board 1 and a pointer 13 attached to an output axis 12a of the stepper motor 12. The stepper motor 12 works as an inner mechanism for driving the pointer 13 according to the measured data of the temperature of the vehicle interior.

A dial plate (not shown) having indexes such as graduations and numbers, letters or marks thereon in order to achieve each meter function is arranged in between each stepper motor and indicator which are components of each meter equipment.

Moreover, the vehicle display system comprises: an infrared light receiving element 14 and a stepping motor driver cum infrared communication IC 15 connected electrically to a speedometer 2 mounted on a front surface 1a; an infrared light receiving element 16 and a stepping motor driver cum infrared communication IC 17 connected electrically to the tachometer 5 mounted on the front surface 1a; an infrared light receiving element 18 and a stepping motor driver cum infrared communication IC 19 connected electrically to the fuel gauge 8 mounted on the front surface 1a; and an infrared light receiving element 20 and a stepping motor driver cum infrared communication IC 21 connected electrically to the thermometer 11 mounted on the front surface 1a. Each infrared light receiving element and stepping motor driver cum infrared communication IC are mounted on the back surface 1b of the display unit board 1.

Further, the vehicle display system includes a control module 22 attached to the back surface 1b of the display unit board 1. This control module 22 has a circuit board with a circuit pattern (not shown) which ICs 24 and a infrared light emitting element 25 are mounted on and connected electrically to through the circuit pattern respectively. Said ICs 24 include an interface (I/F) integrated circuit (IC) and a microcomputer IC.

The control module 22 is detachably attached to the display unit board 1 by two attachments 23. Each attachment 23 has a groove 23a for fitting a board of the control module 22 into one end thereof and two claw-like engaging portions 23b at the other end thereof for engaging the control module 22 resiliently with engaging holes of the display unit board 1.

Each data of vehicle speed, rotations per minute of a rotating shaft, fuel level, and temperature of the vehicle interior measured by various sensors (not shown) is inputted into the control module 22 in such as a serial data format. Then, the measured data is processed according to the inputted data to be assigned a specific identification code respectively and is transmitted as an infrared signal from the infrared light emitting element 25.

The infrared signal transmitted from the infrared light emitting element 25 is received by respective infrared receiving elements 14, 16, 18 and 20 to be supplied to respective stepping motor driver cum infrared communication ICs 15, 17, 19 and 21. Respective Stepping motor driver cum infrared communication ICs 15, 17, 19 and 21 supply respectively the vehicle speed data, the rotations per minute of a rotating shaft data, the fuel level data or the temperature of the vehicle interior selectively according to the specific identification code for each meter, namely, the speedometer 2, the tachometer 5, the fuel gauge 8 or the thermometer 11.

In this manner, a control portion, which is the basic functional portion for controlling the various meters for indicating the measured data of the state of the vehicle, is modularized into the control module 22 to be adapted to every meter. The output from the control module 22 is an infrared communication signal. Each pair of the infrared receiving element and the mating stepping motor driver cum infrared communication IC is mounted in the display unit board 1.

Each of stepper motors 3, 6, 9 and 12 which is a component of an indicator such as the speedometer 2, the tachometer 5, the fuel gauge 8, the thermometer 11 or the like is connected with each of stepping motor driver cum infrared communication ICs 15, 17, 19 and 21, so that said each of stepper motors 3, 6, 9 and 12 is controlled by the infrared signal from the control module 22.

However, in a case that a communication of the control module 22 is limited to the transmission, the control module 22 keeps transmitting data even if some communication trouble occurs. Therefore, if the control module 22 transmits a large amount of data at the time when the communication returns to normal, a probability of stepping out of the stepper motors 3, 6, 9, and 12 becomes high. The control module 22 has to take measures against said stepping out. Resultingly, there is a problem that the display control becomes complicated in this manner.

SUMMARY OF THE INVENTION

This invention has been accomplished to solve the problem and an object of this invention is to provide a vehicle display system for reducing a load of a display unit and correctly controlling a plurality of objects to display by communication. In order to attain the object, according to one aspect of this invention, as a schematic view shown in FIG. 1, there is provided a vehicle display system comprising a plurality of display units 100 each of which including a receiver 111 for receiving measured data indicating a state of the vehicle and a driver controller 130 for controlling an indicator driver 140 according to the measured data, and a controller unit 200 including a transmitter 231 for transmitting the measured data to the display units 100 and a transmitter controller 211a for controlling the transmitter 231. Additionally, in the vehicle display system, each of the plurality of display units 100 further includes a generator 150a for generating response data indicating a state of driving of the indicator driver 140 in response to the received measured data and a transmitter 114 for transmitting the response data to the controller unit 200. Additionally, the controller unit 200 further includes a receiver 233 for receiving each response data and a comparator 211b for comparing each response data with the measured data and judging whether each indicator driver 140 is controllable or not. In this manner, the transmitter controller 211a of the controller unit 200 controls the transmitter of the controller unit 231 according to a judged result of the comparator 211b.

Figure 1:
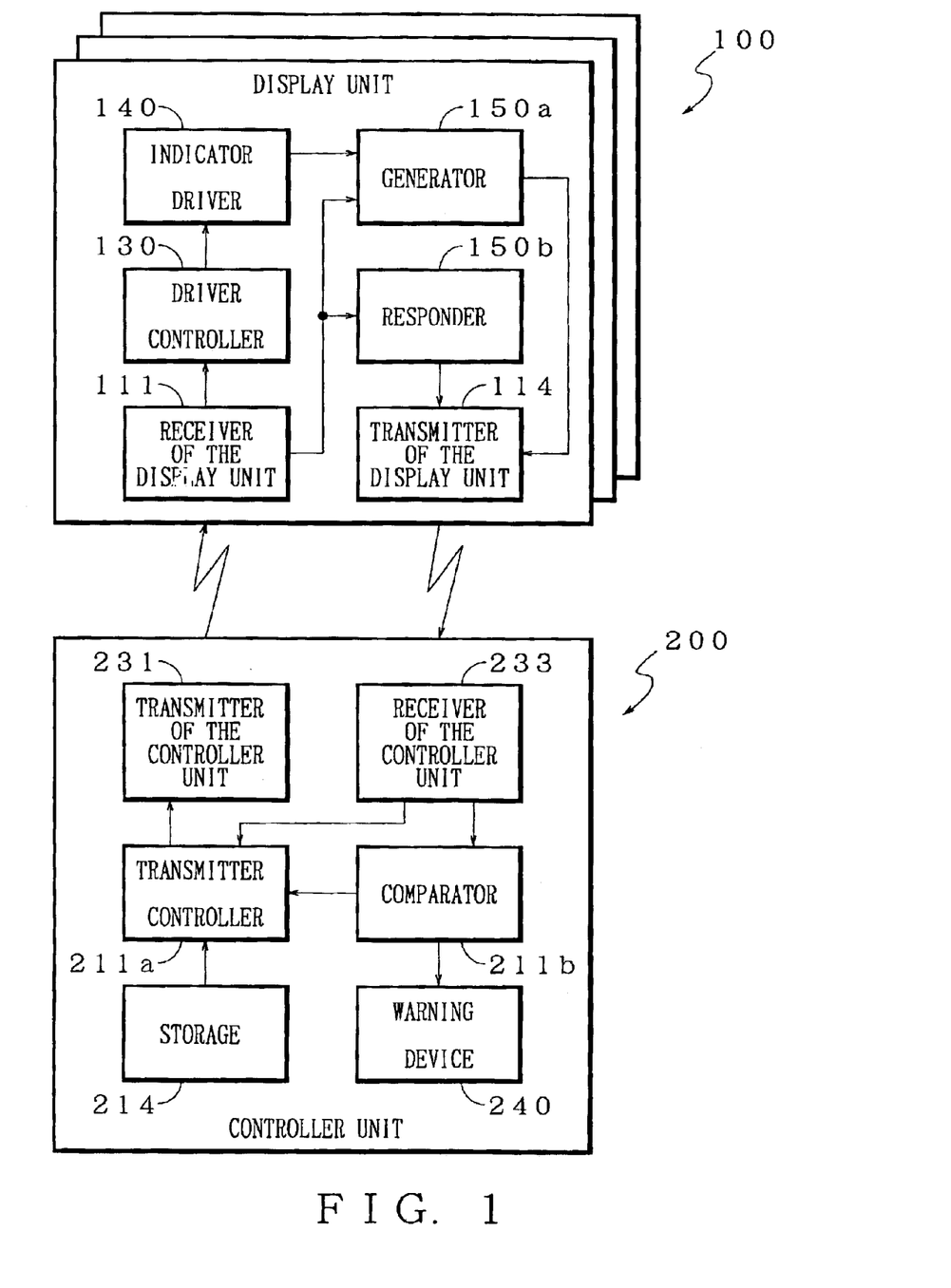
FIG. 1 is a basic schematic view showing a vehicle display according to this invention.

According to this aspect, in the display unit 100, when the measured data is received by the receiver of the display unit 111, the response data is generated by the generator 150a. Then, the response data is transmitted to the controller unit 200 by the transmitter of the display unit 114. Further, in the controller unit 200, when the response data is received by the receiver of the controller unit 233, the response data is compared to the transmitted measured data by the comparator 211b. Then, according to the comparison result, the comparator 211b judges whether the indicator driver 140 of the display unit 100 is controllable or not. Then, according to the judged result, the transmission of the measured data is controlled by the transmitter controller 211a. Accordingly, when the controller unit 200 transmits the measured data to the display unit 100, the display unit 100 generates the response data indicating the state of driving of the indicator driver 140 and transmits the response data to the controller unit 200. Therefore, because the controller unit 200 can recognize whether the each display unit 100 works normally or not, by a comparison of the received response data and the transmitted measured data, the controller unit 200 can cope with an abnormal state when the abnormal state occurs at the indicator driver 140. Namely, because the display unit 100 only needs to have a communication function and a function of driving according to the received measured data, and doesn't need to be aware of a communication state, the load of the display unit 100 can be reduced. Therefore, the display unit 100 can be made as a module corresponding to each object to be displayed such as a speedometer independently, so that an arrangement of the display unit 100 can be given flexibility. Moreover, because the display system is controlled depending not only on the communication state between each display unit 100 and the controller unit 200, but also on the state of driving of the indicator driver 140 of each display unit 100, accuracy of the displaying contents can certainly be improved.

According to said aspect of this invention as shown in FIG. 1, preferably, the vehicle display system further comprises a warning device 240 for warning of a state of the indicator driven by the indicator driver 140 when the comparator 211b judges that the indicator driver 140 is under a state of uncontrol.

According to said vehicle display system, when the comparator 211b is judged as abnormal, the warning device 240 warns of the state of the indicator according to the judged result. Therefore, because the warning device 240 warns of a state of the display unit 100 when the controller unit 200 detects an abnormal state of the display unit 100, the display unit 100 has no necessity to have a warning function. Therefore, a composition of the display unit 100 can be simplified further.

According to this invention, preferably, as shown in FIG. 1, there is provided the vehicle display system, wherein the receiver of the display 111 is so composed as to receive an installation confirmation request from the controller unit 200, the display unit 100 further comprises a responder 150b for responding the installation confirmation request to allow the transmitter of the display unit 114 to transmit display unit data for identifying said display unit 100, the controller unit 200 further comprises a memory 214 for memorizing a list of installation options listing each display unit 100 having a feasibility to be installed, and the transmitter controller 211a so controls that the transmitter of the controller unit 231 transmits the installation confirmation request to the display unit 100 listed on the list of installation options memorized by the memory 214, and transmits the measured data only to the display unit 100 corresponding to respective display unit data which is received by the receiver of the controller unit 233 in response to the installation confirmation request.

According to above described vehicle display system, the memory 214 memorizes in advance the list of installation options listing the display units 100 having a feasibility to be installed. Further, the transmitter controller 211a so controls that the transmitter of the controller unit 231 transmits, for example at starting time of the control, the installation confirmation request to the display unit 100 listed by the list of installation options and transmits the measured data only to the display unit 100 corresponding to respective display unit data which is received by the receiver of the controller unit 233 in response to the installation confirmation request. Therefore, the means for memorizing 214 memorizes the list of installation options listing the display unit 100 having a feasibility to be installed. Then, the transmitter of the controller unit 231 transmits the installation confirmation request to the display unit 100 listed by the list of installation options. Then, the receiver of the controller unit 233 receives the display unit data in response to the installation confirmation request to confirm the installation of said display unit 100. Then, the transmitter of the controller unit 231 transmits the measured data to the installed display unit 100, so that the controller unit 200 can be used in common. Resultingly, the component of said vehicle display system can be easily changed by such as adding or deleting the display unit 100.

According to this invention, preferably, as shown in FIG. 1, there is provided the vehicle display system, wherein the indicator driver 140 moves the a pointer to a position of indication in response to the measured data, the generator 150a generates the response data indicating that said indicator driver 140 is under a process of detection of an initial position of indication of said pointer moved by the indicator driver 140 when the receiver of the display 111 receives the measured data under the process of detection, and the transmitter controller 211a so controls that the transmitter of the controller unit 231 transmits the measured data again when the receiver of the controller unit 233 receives the response data indicating that the indicator driver 140 is under the process of detection.

According to above described vehicle display system, when the receiver of the display 111 receives the measured data under a process of detection of the initial position of indication such as zero position of the pointer moved by the indicator driver 140, the generator 150a generates the response data indicating that the indicator driver 140 is under the process of detection. Then, when the receiver of the controller unit 233 receives the response data, the transmitter controller 211a controls the transmitter of the controller unit 231 to transmit the measured data again. If the indicator driver 140 is a stepper motor, the indicator driver 140 detects an initial position at starting time. In such a case, when receiving the measured data under said process of detection, the transmitter of the display 114 returns the response data indicating that the indicator driver 140 is under the process of detection, so that the controller unit 200 can recognize whether the display unit 100 is under the process of detection of the initial position or not. Therefore, this vehicle display system can prevent mis-recognition that the display unit 100 has some trouble. Moreover, because the display unit 100 ignores the received measured data until the detection is finished, no stepping out of the indicator driver 140 occurs and driving control of the indicator driver 140 can be simple. Therefore, the composition of the display unit 100 can be simpler and the controller unit 200 can control the displays of the plurality of display units 100 accurately.

According to this invention as shown in FIG. 1, preferably, there is provided the vehicle display system, wherein display units 100 are mounted on respective substrates.

According to above described vehicle display system, the display units 100 are mounted on respective substrates to be arranged on an instrument panel of the vehicle. Therefore, by assembling the display units 100 on the respective substrates, a flexibility of arranging the display units 100 in an interior of the vehicle can be increased. Therefore, the arrangement of the display units 100 can be novel, so that commercial value of the vehicle display system can be increased.

DESCRIPTION OF THE PREFERRED EMBODIMENT

One embodiment of a vehicle display system according to this invention will now be described below with reference to the attached drawings.

Figure 2:
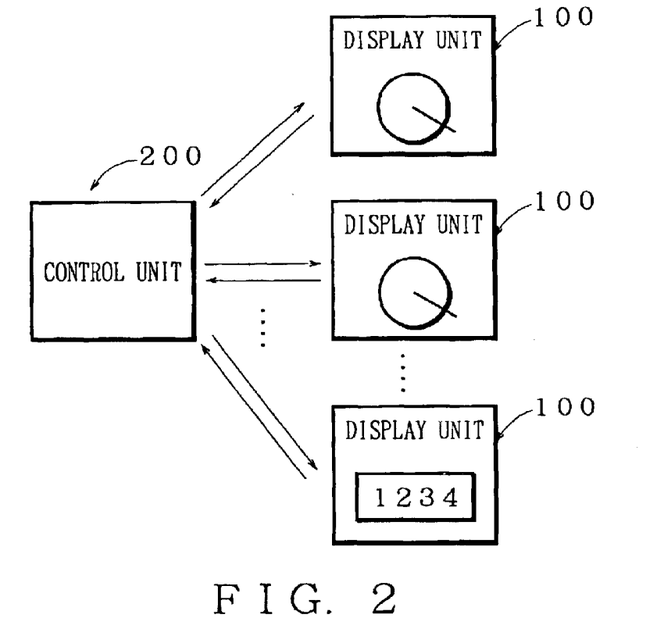
FIG. 2 is a schematic view showing one embodiment of this invention.

The vehicle display system mounted on a vehicle is composed of, as shown in FIG. 2, a plurality of display units 100 corresponding respectively to a speedometer for indicating the vehicle speed, a tachometer for indicating rotations per minute of a rotating shaft, a fuel gauge for indicating the fuel level, a thermometer for indicating a temperature of the vehicle interior and the like, and a controller unit 200 for controlling said display units 100.

Figure 3:
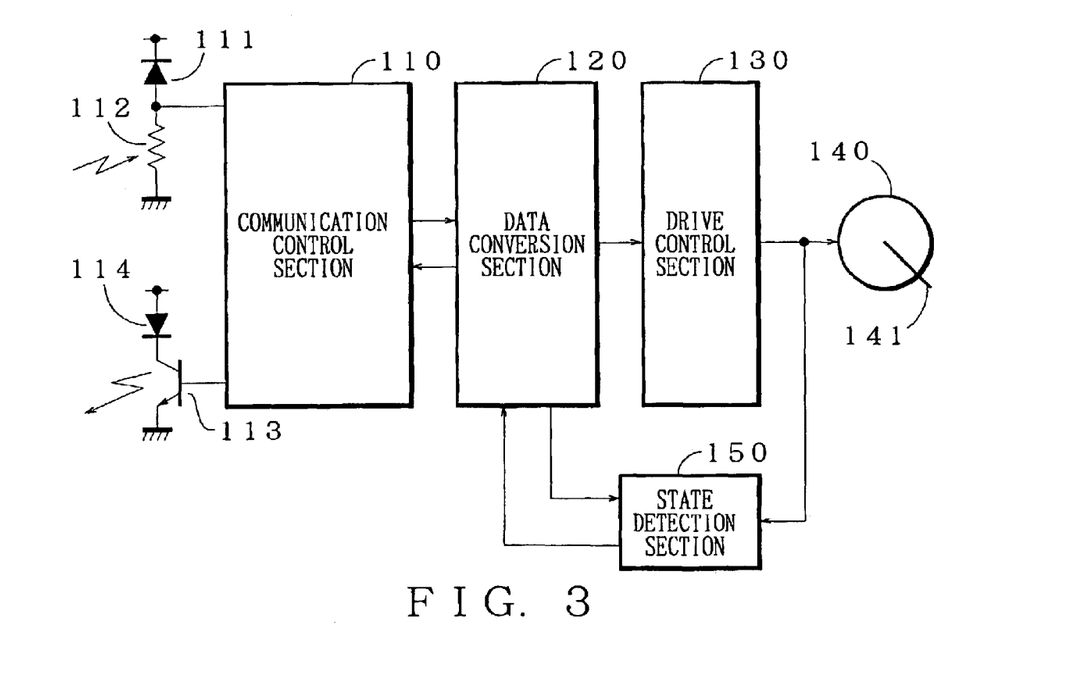
FIG. 3 is a schematic view showing one composition of a display unit of FIG. 2.

As shown in FIG. 3, The display unit 100 comprises a communication control section 110 for controlling transmission and reception of data to and from the controller unit 200, a data conversion section 120 for converting data received by the communication control section 110, a drive control section (driver controller) 130 for controlling drive of a driving section (indicator driver) 140 according to data converted by the data conversion section 120, and a state detection section 150 for generating response data indicating the state of driving of the driving section 140.

A communication IC for infrared communication and the like is used for the communication control section 110. An input terminal of the communication control section 110 is connected with both an anode of a photodiode (receiver of the display unit) 111 and one end of a resistor 112. A cathode of the photodiode 111 is connected to a power supply. The other end of the resistor 112 is grounded. An output terminal of the communication control section 110 is connected with a base of a transistor 113. A collector of the transistor 113 is connected with a cathode of a light emitting diode (transmitter of the display unit) 114 and an emitter of the transistor 113 is grounded.

In this composition, the communication control section 110 detects an infrared signal from a voltage change of the photodiode 111 and outputs an electric signal to the data conversion section 120. On the other hand, the communication control section 110 makes the transmitter of the display unit 114 emit light by controlling the transistor 113 according to an analog signal inputted from the data conversion section 120.

An IC, a DSP (digital signal processor), and the like are used for the data conversion section 120. The data conversion section 120 converts the signal received by the communication control section 110 to driving data and outputs the driving data to the drive control section 130. On the other hand, the data conversion section 120 converts state of driving data received from the state detection section 150 to the analog signal and outputs the converted data to the communication control section 110. Then, the communication control section 110 controls the transistor 113 according to the received analog signal, so that the response data is transmitted to the controller unit 200.

An IC, a DSP (digital signal processor), and the like are used for the drive control section 130. Driving devices such as a stepper motor, a cross coil driver, an LED driver, and an LCD driver are used for the driving section 140. Incidentally, in this embodiment as shown in FIG. 3, a pointer 141 is mounted on an end of an output axis of a stepper motor (driving section) 140. Hereafter, the case where the driving section 140 is the stepper motor will be described. The drive control section 130 outputs a driving signal to the driving section 140 according to driving data received from the data conversion section 120, so that the pointer 141 is moved by the driving section 140 by a deflection angle indicated by the driving signal.

An IC, a DSP (digital signal processor), and the like are used for the state detection section 150 equivalent to the generator 150a and the responder 150b. When recognizing that the data conversion section 120 receives the measured data by referring the data conversion section 120, the state detection section 150 generates response data indicating the driving state of the driving section 140 driven by the drive control section 130, and outputs the response data to the data conversion section 120. Incidentally, by way of example, the response data 140 includes such as data of a position of indication of the pointer 141 moved by the driving section 140. And the response data is converted to an analog signal and transmitted to the controller unit 200 as above described.

Further, when receiving a installation confirmation request from the data conversion section 120, the state detection section 150 generates display unit data having an ID code for identifying the display unit 100 and output the display unit data to the data conversion section 120. Then, the display unit data is converted to the analog signal and transmitted to the controller unit 200 as above described.

Figure 4:
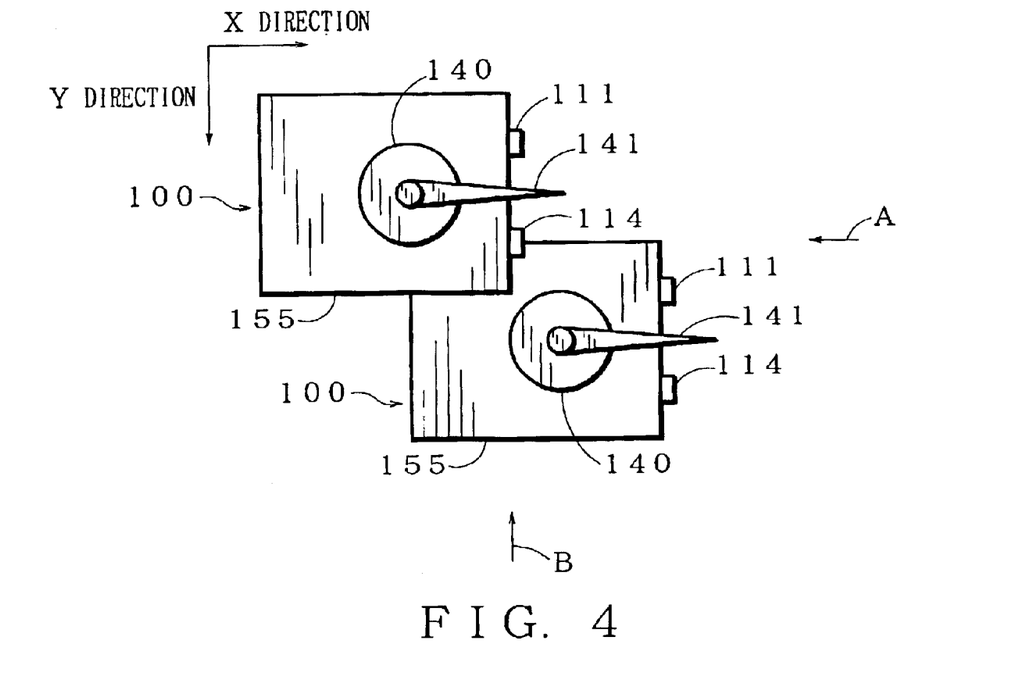
FIG. 4 is an explanation view for explaining an arrangement of the display units.
Figure 5:
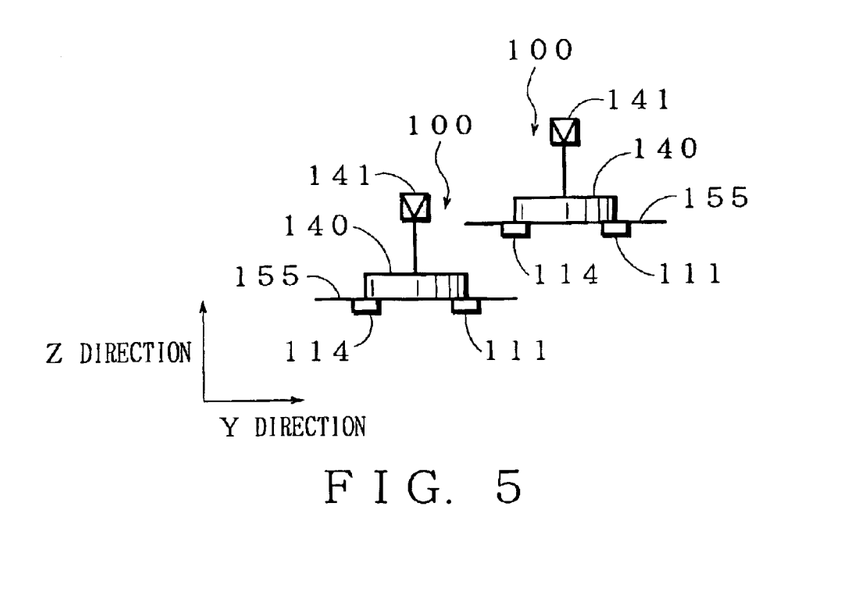
FIG. 5 is a front view taken in a direction of arrow A of FIG. 4.
Figure 6:
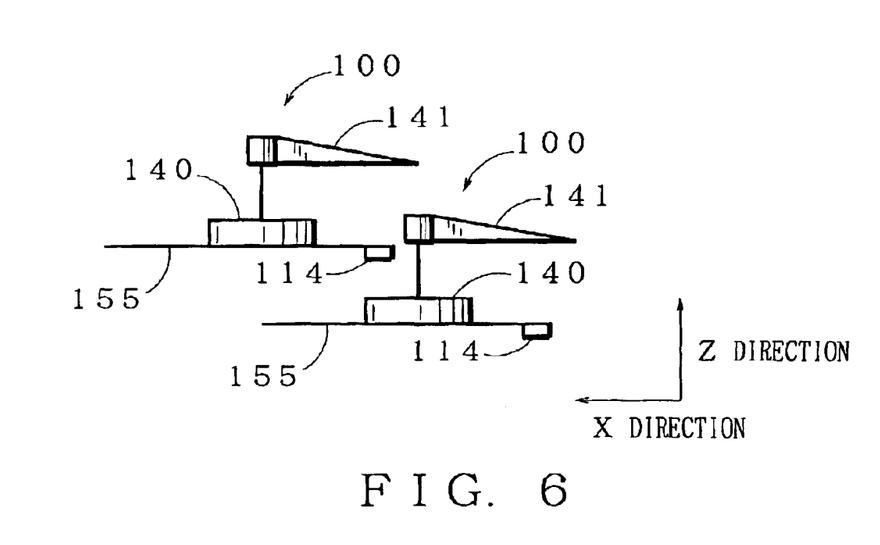
FIG. 6 is a front view taken in a direction of arrow B of FIG. 4.

Next, an example of arrangement of a plurality of display units 100 will be described below with reference to FIG. 4 to 6.

Components for composing the display unit 100, such as the communication control section 110, the photodiode (receiver of the display unit) 111, the resistor 112, the transistor 113, the emitting diode (transmitter of the display unit) 114, the data conversion section 120, the drive control section 130, the driving section 140, and the state detection section 150 are assembled on each substrate 155 corresponding to each display unit 100 and arranged on an instrument panel of the vehicle.

Mounting each display unit 100 on each substrate 155 gives more flexibility to a layout of the display units 100. Therefore, each display unit 100 can be arranged staggered not only in XY directions of FIG. 4 but also in Z-axis direction of FIG. 5. Resultingly, various distinguishable designs, such as arranging the display units 100 in three dimensions on the instrument panel, can easily be offered to increase the commercial value of the instrument panel.

Figure 7:
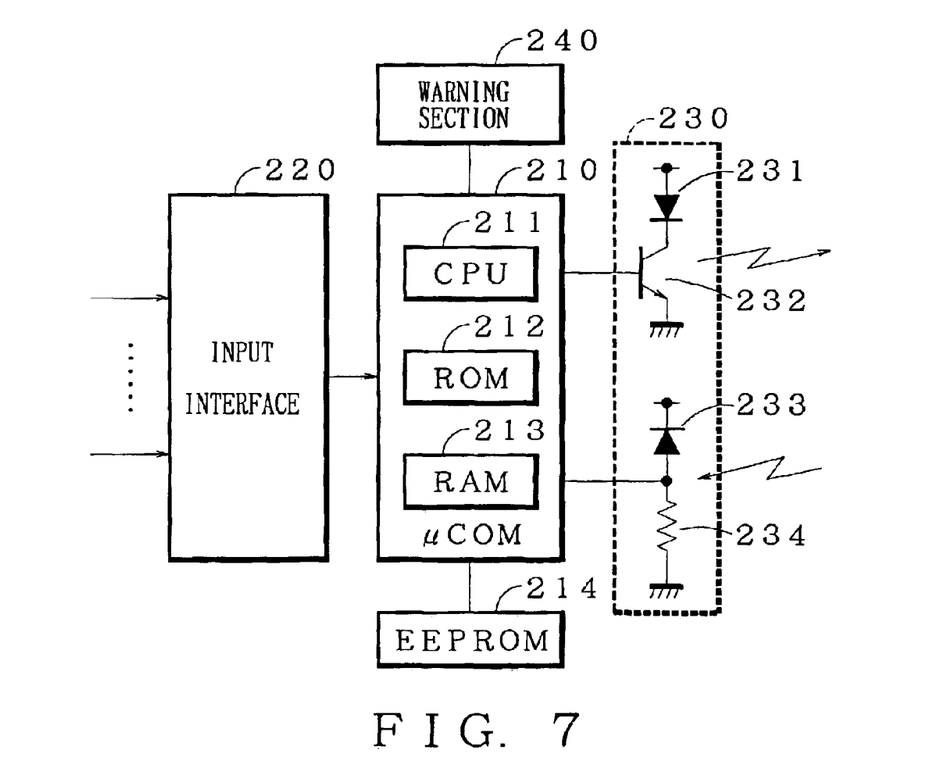
FIG. 7 is a schematic view showing one embodiment of a controller unit of FIG. 2.

As shown in FIG. 7, the controller unit 200 includes a microcomputer 210 operating according to a predetermined program, an input interface (I/F) 220 connected to the microcomputer 210, a communication section 230, and a warning section 240.

As generally known, the microcomputer 210 is composed of at least a central processing unit (CPU) 211 for processing various processes and various controls according to the predetermined program, a read only memory (ROM) 212 for memorizing the predetermined program for CPU 211, and a random access memory (RAM) 213 for memorizing various data and offering a working area for CPU 211.

Moreover, the microcomputer 210 is connected to an electrically erasable programmable read only memory (EEPROM) 214 which is able to maintain data even when an main part of equipment is an OFF state. The EEPROM 214 memorizes various data such as the list of installation options listing each display unit 100 having a feasibility to be installed. Therefore, because the EEPROM 214 memorizes the list of installation options, the EEPROM 214 is employed as the means for memorizing the list of installation options.

Additionally, one example of the list of installation options is ID code data, which is memorized corresponding to each vehicle type, for identifying respectively the speedometer, the tachometer, the fuel gauge, the thermometer and the like.

The input interface 220 receives each data of vehicle speed, rotations per minute of a rotating shaft, fuel level, vehicle interior temperature, and the like in such as serial data format. Then, the microcomputer 210 generates measured data by associating the received data with a specific code for identifying an object to be displayed.

The communication section 230 is able to communicate with the display unit 100 by infrared signal. More specifically, in the communication section, a transmitting section is composed of an emitting diode (transmitter of the controller unit) 231 and a transistor 232, and a receiving section is composed of a photodiode (receiver of the controller unit) 233 and a resistor 234.

A cathode of the light emitting diode 231 is connected to a collector of the transistor 232 of which a base is connected to the microcomputer 210. An anode of the light emitting diode 231 is connected to the power source. An emitter of the transistor 232 is grounded. Further, an anode of the photodiode 233 and one end of the resistor 234 are connected to the microcomputer 210. A cathode of the photodiode 233 is connected to the power source. The other end of the resistor 234 is grounded.

The microcomputer 210 transmits the measured data to the display unit 100 by controlling the transistor 232 to emit the light emitting diode 231 according to the measured data. Additionally, the microcomputer 210 recognizes the received data by detecting infrared signal from a change of the photodiode 233 voltage.

A warning device 240 is equipped with abnormal sound, red light and the like to warn a vehicle driver of an abnormal state of the display unit 100 according to an instruction of the microcomputer 210. In this embodiment, because the warning device 240 warns of an abnormal state such as an uncontrollable state of the display unit 100, the display unit 100 is only equipped with a driving function and a communication function to be reduced a load of the display unit 100.

Figure 8:
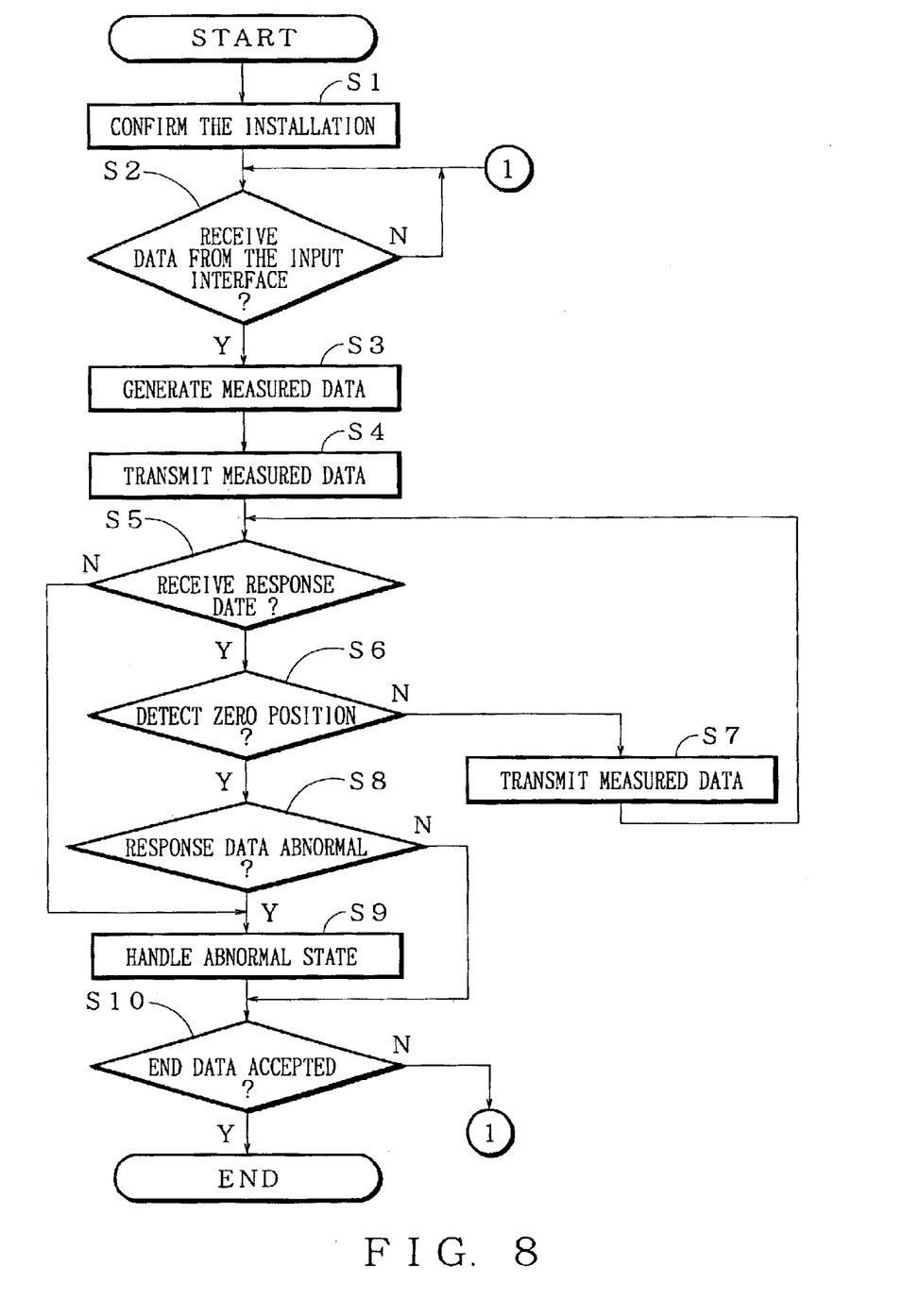
FIG. 8 is a flow chart showing one embodiment of data processing done by a CPU of FIG. 7.

Next, an example of an outline of a process processed by the CPU 211 of the controller unit 200 according to this invention will be described below with referring to a flow chart of FIG. 8.

When supplying the power source from such as a vehicle battery to start up the CPU 211, the installation confirmation process is done in step S1. Namely, the installation confirmation request is generated to confirm installation of each display unit 100 listed by the list of installation options memorized in the EEPROM 214. Then, by emitting light of the transmitter of the controller unit 231, the installation confirmation request is transmitted. Then, according to whether receiving the response data from the display unit 100 responding to the installation confirmation request within a specific time or not, installation data indicating an installation state of the display units 100 is written in the EEPROM 214. Then, the process proceeds to step S2.

In step S2, whether data from the input interface 220 is received or not is judged. If the data is judged not to be received ("N" in step S2), this judging process is repeated to wait for the data to be received. On the other hand, if the data is judged as being received ("Y" in step S2), the process proceeds to step S3.

In step S3, by doing the measured data generation process, measured value is calculated according to the received data from the input interface 220. Then, the measured data by associating the measured value with a specific code for identifying the display unit 100 is written in RAM 213. Then, the process proceeds to step S4.

In step S4, by doing a measured data transmitting process, the transistor 232 is controlled to transmit the generated measured data. In this step, the controller unit 200 transmits the measured data to the display unit 100. Then, the process proceeds to step S5.

In step S5, whether the response data is received or not is judged by a change in the photodiode 233 voltage. If the response data is judged not to be received ("N" in step S5), this process proceeds to step S9. On the other hand, if the response data is judged as being received ("Y" in step S5), the process proceeds to step S6. In step S6, whether zero position detection, which is employed to detect zero position (initial position) of the pointer 141 of the display unit 100, is finished or not is judged by referring to zero position detection flag whether zero detection is doing or not.

In step S6, if the zero position detection is judged as unfinished ("N" in step 56), the display unit 100 is regarded as uncontrollable. Consequently, in step S7, by doing measured data retransmitting process, the transistor 232 is controlled, like in step S4, to retransmit the measured data generated in the RAM 213. Then, the process is back to step S5 and a series of processes is repeated. By these processes, the controller unit 200 retransmits the measured data to the display unit 100.

On the other hand, if the zero position detection is judged as being finished in step S6 ("y" in step S6), the display unit 100 is regarded as controllable. Then, in step S8, received response data and transmitted measured data are compared with each other. For example, by judging whether a pointing position of the pointer 141 indicating the response data agrees with the measured value indicated in the measured data or not, the response data is judged as normal or abnormal.

In step S8, if the response data is not judged as abnormal ("N" in step S8), namely, the pointing position of the pointer 141 agrees with the measured data, the display unit 100 is regarded as controllable and the process proceeds to step S10. On the other hand, if the response data is judged as abnormal ("Y" in step S8), namely, the pointing position of the pointer 141 does not agree with the measured data, the display unit 100 is regarded as abnormal and the process proceeds to step S9.

In step S9, by doing an abnormal state handling process, warning data is generated to warn of the abnormal state of the display unit 100. Then this warning data is transmitted to the warning device 240, and the process proceeds to step S10. Because the warning device 240 warns by this process, users can recognize the abnormal state of the display unit 100.

In step S10, whether an end request is accepted by the display unit 100 or not is judged. If the end request is judged not to be accepted ("N" in step S10), the process is back to step S2 and a series of processes is repeated. On the other hand, if the end request is judged as being accepted ("Y" in step S10), the process is completed.

Therefore, it is clear from the above that the CPU 211 of the controller unit 200 is functioning as the means for controlling transmission and the judgment means of claims.

Figure 9:
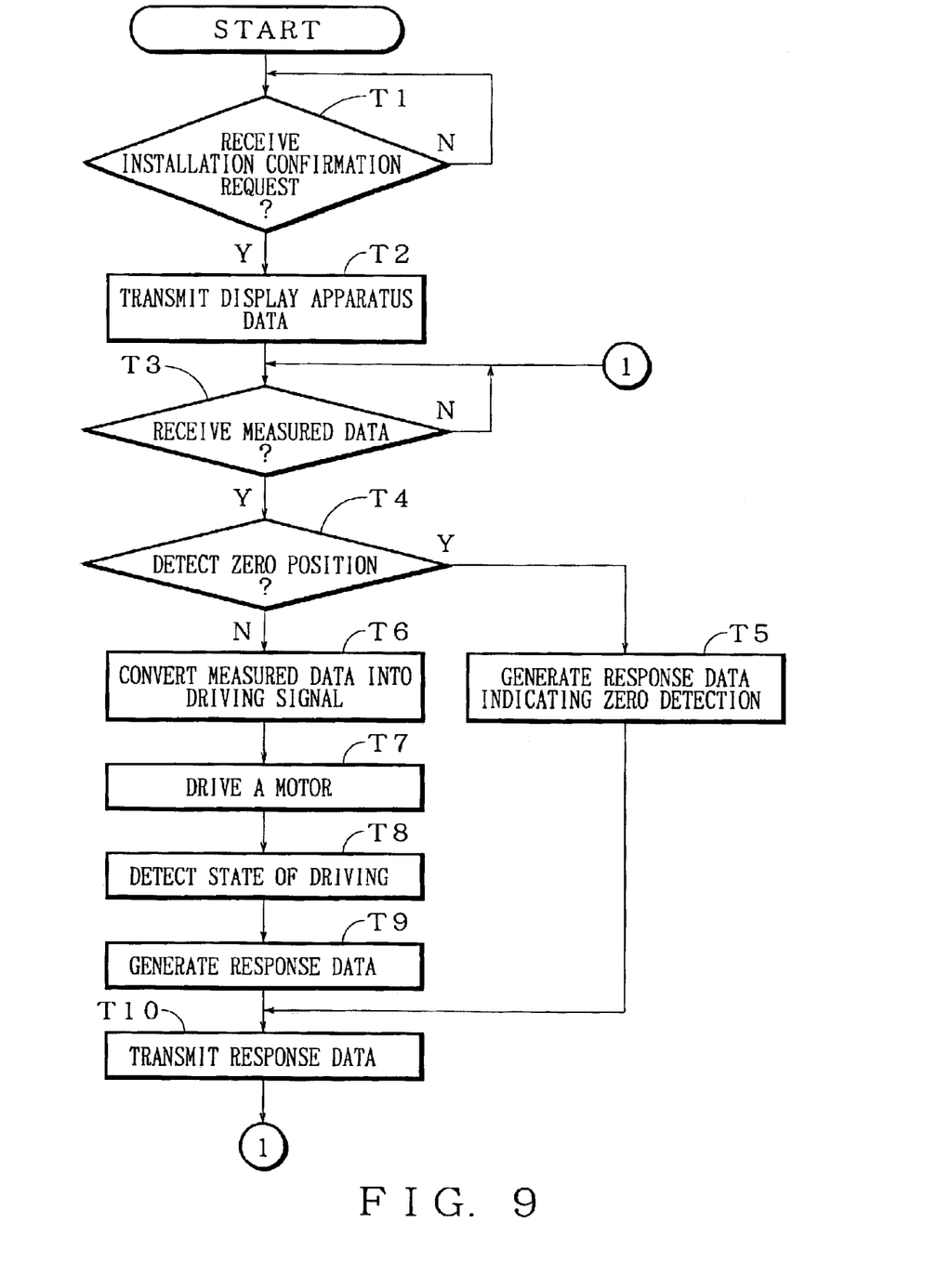
FIG. 9 is a flow chart for explaining one embodiment of operation of the display unit.

Next, an example of an operation (action) of the vehicle display system of this invention will be described below with reference to a flow chart shown in FIG. 9 focusing on the display unit 100. Additionally, this example is built on a premise that the process in the display unit 100 is ended by stopping supplying electric power.

When supplying the power source from such as a vehicle battery to start up the display unit 100, the display unit 100 waits for receiving the installation confirmation request from the controller unit 200 (step T1). Then, if the installation confirmation request is received ("Y" in step T1), an display unit data having an ID code for identifying the display unit 100 corresponding to the installation confirmation request is generated at the state detection section 150. Then, the display unit data is transmitted to the communication control section 110 by the controller unit 200 (step T2). Then, by receiving the display unit data, the controller unit 200 recognizes an installation of said display unit 100.

On the other hand, the display unit 100 waits for receiving the measured data from the controller unit 200 ("N" in step T3). If the display unit 100 receives the measured data having the ID code for identifying said display unit 100 ("Y" in step T3), the display unit 100 judges whether the zero position detection for detecting zero position (initial position) of the pointer 141 is doing or not (step T4).

If the zero position detection is judged as being under detection ("Y" in step T4), the display unit 100 generates the response data indicating that the display unit 100 is under a process of zero position detection and transmits the response data to the controller unit 200. Then, the controller unit 200 recognizes that the display unit 100 is under the process of zero position detection according to the received response data and retransmits the measuring data that has been transmitted previously. By repeating this exchange, the controller unit 200 can detect the end of zero position detection.

On the other hand, if the zero point detection is judged not to be employed ("N" in step T4), the drive control section 130 converts the received measured data into a driving signal (step T6), and outputs the driving signal to the driving section 140 to move the pointer 141 by a deflection angle indicated by the driving signal (step T7).

The state detection section 150 detects the driving state of the driving section 140 such as the pointing position of the pointer 141 (step T8), then generates the response data indicating the detected driving state (step T9). Additionally, for an example, the response data includes the ID code for identifying the display unit 100, the detected driving state, and the zero position detection flag for indicating whether the zero position detection is executed or not. Then, the data conversion section 120 converts the generated response data to an analog signal and outputs the analog signal to the communication control section 110, so that the response data is transmitted to the 200 (step T10). A series of processes of step T3 to T10 is repeated afterwards.

On the other hand, when receiving the response data, the controller unit 200 judges whether the display unit 100 is operating normally or not, according to a comparison of the received response data and the measured data previously transmitted to the display unit 100. Then, if the operation of the display unit 100 is judged as normal, next measured data is generated and transmitted to the display unit 100. If the operation of the display unit 100 is judged as abnormal, the warning device 240 warns of the abnormal state of the display unit 100.

Although this invention has been fully described by way of examples with reference to the accompanying drawings, it is to be noted that various changes and modifications can be made in a scope of this invention.

What is claimed is:

1. In a vehicle display system comprising a plurality of display units each of which including a receiver for receiving measured data indicating a state of the vehicle and a driver controller for controlling an indicator driver according to the measured data, and a controller unit including a transmitter for transmitting the measured data to the display units and a transmitter controller for controlling the transmitter, the vehicle display system comprising:

the plurality of display units each of which further including a generator for generating response data indicating a state of driving of the indicator driver in response to the received measured data, and a transmitter for transmitting the response data to the controller unit; and the controller unit further including a receiver for receiving each response data, and a comparator for comparing each response data with the measured data and judging whether each indicator driver is controllable or not, whereby said transmitter controller of the controller unit controls the transmitter of the controller unit according to a judged result of the comparator.

2. The vehicle display system as claimed in claim 1, further comprising a warning device for warning of a state of the indicator driven by the indicator driver when the comparator judges that the indicator driver is under a state of uncontrol.

3. The vehicle display system as claimed in claim 1, wherein the receiver of the display unit is so composed as to receive an installation confirmation request from the controller unit, the display unit further comprises a responder for responding the installation confirmation request to allow the transmitter of the display unit to transmit display unit data for identifying said display unit, the controller unit further comprises a memory for memorizing a list of installation options listing each display unit having a feasibility to be installed, and the transmitter controller so controls that the transmitter of the controller unit transmits the installation confirmation request to the display unit listed on the list of installation options memorized by the memory, and transmits the measured data only to the display unit corresponding to respective display unit data which is received by the receiver of the controller unit in response to the installation confirmation request.

4. The vehicle display system as claimed in claim 2, wherein the receiver of the display unit is so composed as to receive an installation confirmation request from the controller unit, the display unit further comprises a responder for responding the installation confirmation request to allow the transmitter of the display unit to transmit display unit data for identifying said display unit, the controller unit further comprises a memory for memorizing a list of installation options listing each display unit having a feasibility to be installed, and the transmitter controller so controls that the transmitter of the controller unit transmits the installation confirmation request to the display unit listed on the list of installation options memorized by the memory, and transmits the measured data only to the display unit corresponding to respective display unit data which is received by the receiver of the controller unit in response to the installation confirmation request.

5. The vehicle display system as claimed in claim 1, wherein the indicator driver moves a pointer to a position of indication in response to the measured data, the generator generates the response data indicating that said indicator driver is under a process of detection of an initial position of indication of said pointer moved by the indicator driver when the receiver of the display unit receives the measured data under the process of detection, and the transmitter controller so controls that the transmitter of the controller unit transmits the measured data again when the receiver of the controller unit receives the response data indicating that the indicator driver is under the process of detection.

6. The vehicle display system as claimed in claim 2, wherein the indicator driver moves a pointer to a position of indication in response to the measured data, the generator generates the response data indicating that said indicator driver is under a process of detection of an initial position of indication of said pointer moved by the indicator driver when the receiver of the display unit receives the measured data under the process of detection, and the transmitter controller so controls that the transmitter of the controller unit transmits the measured data again when the receiver of the controller unit receives the response data indicating that the indicator driver is under the process of detection.

7. The vehicle display system as claimed in claim 3, wherein the indicator driver moves a pointer to a position of indication in response to the measured data, the generator generates the response data indicating that said indicator driver is under a process of detection of an initial position of indication of said pointer moved by the indicator driver when the receiver of the display unit receives the measured data under the process of detection, and the transmitter controller so controls that the transmitter of the controller unit transmits the measured data again when the receiver of the controller unit receives the response data indicating that the indicator driver is under the process of detection.

8. The vehicle display system as claimed in claim 4, wherein the indicator driver moves a pointer to a position of indication in response to the measured data, the generator generates the response data indicating that said indicator driver is under a process of detection of an initial position of indication of said pointer moved by the indicator driver when the receiver of the display unit receives the measured data under the process of detection, and the transmitter controller so controls that the transmitter of the controller unit transmits the measured data again when the receiver of the controller unit receives the response data indicating that the indicator driver is under the process of detection.

9. The vehicle display system as claimed in claim 1 wherein the display units are mounted on respective substrates.

10. The vehicle display system as claimed in claim 2, wherein the display units are mounted on respective substrates.

11. The vehicle display system as claimed in claim 3, wherein the display units are mounted on respective substrates.

12. The vehicle display system as claimed in claim 4, wherein the display units are mounted on respective substrates.

13. The vehicle display system as claimed in claim 5, wherein the display units are mounted on respective substrates.

14. The vehicle display system as claimed in claim 6, wherein the display units are mounted on respective substrates.

15. The vehicle display system as claimed in claim 7, wherein the display units are mounted on respective substrates.

16. The vehicle display system as claimed in claim 8, wherein the display units are mounted on respective substrates.

* * * * *